May 26, 1964     W. R. CROOKS     3,134,371
COOLING SYSTEM FOR INTERNAL COMBUSTION ENGINES
Filed Oct. 29, 1962     2 Sheets-Sheet 1

INVENTOR.
WILLIAM R. CROOKS
BY
Owen & Owen
ATTORNEYS

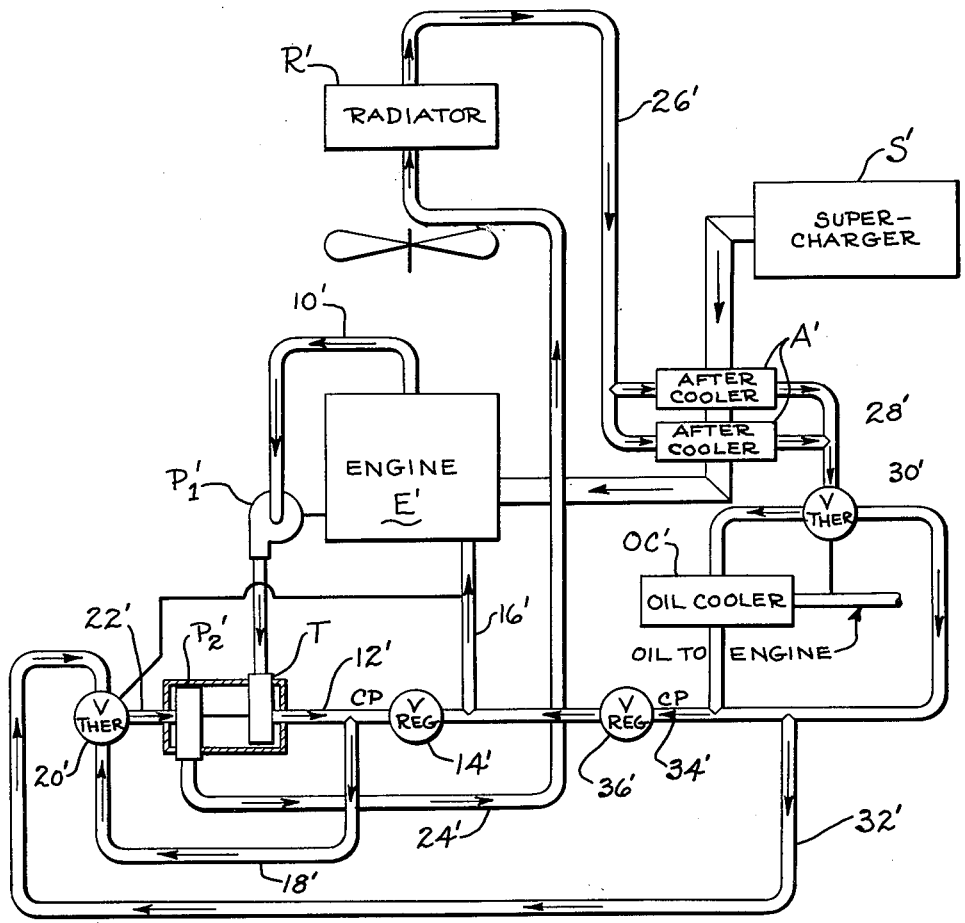

United States Patent Office 3,134,371
Patented May 26, 1964

3,134,371
COOLING SYSTEM FOR INTERNAL COMBUSTION ENGINES
William R. Crooks, Mount Vernon, Ohio, assignor to The Cooper-Bessemer Corporation, Mount Vernon, Ohio, a corporation of Ohio
Filed Oct. 29, 1962, Ser. No. 233,828
3 Claims. (Cl. 123—41.31)

The present invention relates to cooling systems for internal combustion engines; and more particularly for cooling systems for supercharged internal combustion engines.

The principal object of the present invention is the provision of a new and improved cooling system for a supercharged internal combustion engine which will increase the power which can be produced by the engine without producing detonation, and which will also increase its thermal efficiency.

The invention resides in certain constructions and combinations and arrangements of parts, and further objects and advantages of the present invention will become apparent to those skilled in the art to which it relates, from the following description of several preferred embodiments described with reference to the accompanying drawings forming a part of the specification, and in which:

FIG. 2 is a schematic view similar to FIG. 1 and differing principally therefrom in that a slightly different pumping arrangement is utilized to produce circulatory flows.

Figure 1:
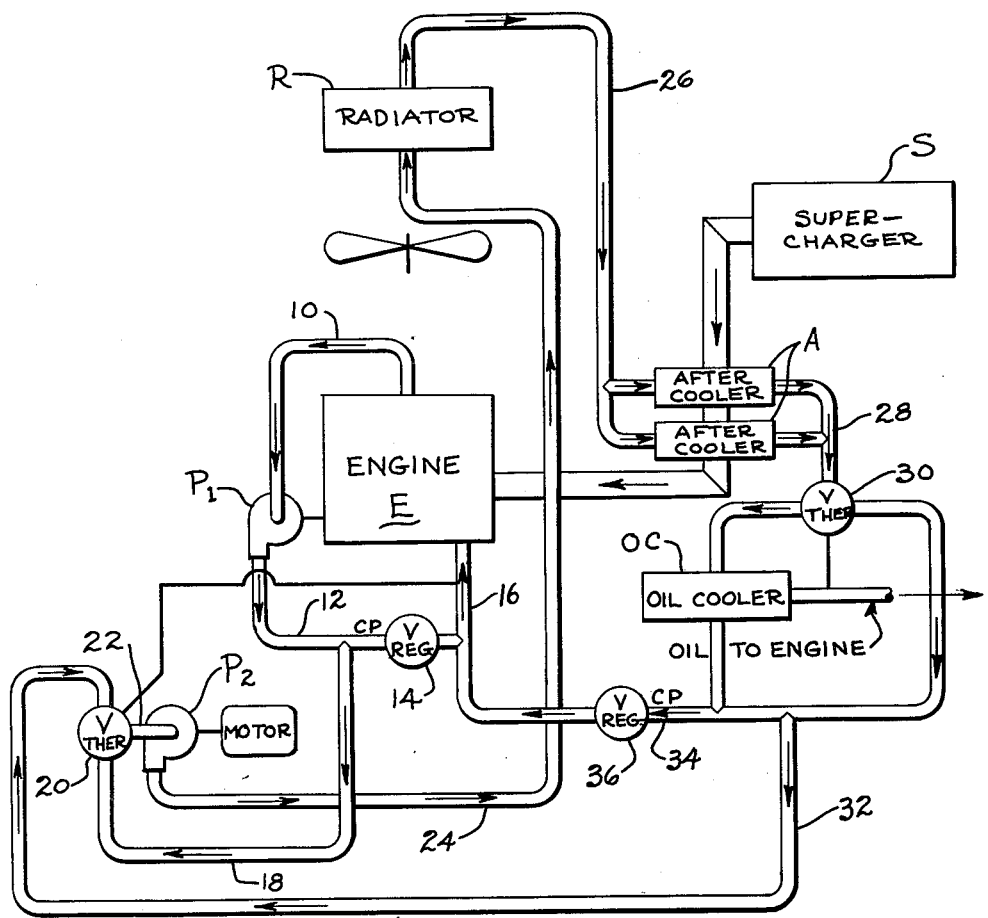
FIG. 1 is a schematic view of a cooling system for a supercharged internal combustion engine.

Cooling systems which have been used heretofore for large supercharged engines generally include means to cause a large recirculating flow through the jacket of the engine. A generally fixed percentage of the recirculatory flow is split off and is passed through a radiator following which the now cooled coolant from the radiator is passed through supercharger aftercoolers and used to cool the air that is fed to the engine. The coolant which is passed through the aftercoolers is still at a lower temperature than the recirculatory flow and can be fed back into the recirculatory flow to cool the engine. The temperature of the fluid that is recirculated through the engine is usually controlled by radiator shutters which are opened as the temperature of the recirculatory flow through the engine increases and are closed as the temperature of the recirculatory flow through the engine decreases, and the prior art has made no attempt to control the air temperature that is fed to the engine apart from that which is obtained by the regulation of the shutters in accordance with engine-jacket temperature alone.

According to the present invention, it has been determined that the load on any given engine can be increased by about 3.0% for each 10° F. reduction in temperature of the air that is fed to the engine for combustion. In addition, a reduction in combustion air temperature reduces the fuel consumption of the engine by approximately 0.5% for each 10° F. reduction in temperature of the air fed to the engine.

According to the principles of the present invention, a cooling system is provided wherein a large stream of coolant is continually recirculated through the engine and this flow is maintained at a constant temperature, say 160° F., by the addition of varying amounts of a second, cooler stream so that proper operating conditions are maintained at all times. The second stream is a smaller side stream which passes through a radiator and then through the aftercoolers for the supercharger to cool the air fed to the engine. In the present instance, however, no radiator shutters are utilized. In the present instance, the water which passes through the radiator is cooled without control and is cooled as much as is possible. This cooled fluid is then passed through the aftercoolers to cool down the air fed to the engine to as low a temperature as possible. Thereafter, relatively cool liquid received from the aftercoolers is fed to the first mentioned recirculatory stream in a controlled amount to maintain the temperature of the engine at the desired level, while the balance of the second stream flowing from the radiator is recirculated to the radiator to be recooled.

FIG. 1 of the drawings shows the general scheme of cooling system that comprises the present invention. The system shown in FIG. 1 includes an engine E, through the jacket of which, a cooling liquid is recirculated by means of the recirculating conduits 10 and 12 and the pump P1. The discharge from the pump P1 passes through conduit 12, a back pressure valve 14, and then through a recirculating conduit 16 to the inlet of the jacket of the engine E. The pump P1 may be driven in any suitable manner, and as shown in the drawing, is driven directly from the engine E. The rate of recirculation through the engine is kept purposely large so as to produce uniform cooling throughout the jacket of the engine, and in the embodiment shown in the drawing is at a rate of approximately 915 gallons per minute.

The temperature of the recirculating cooling fluid for the first or jacket cooling circuit is controlled by means of a radiator or secondary circuit by injecting more or less cold fluid into the recirculating stream. Flow through the radiator or secondary coolant circuit is produced by the pump P2 which takes its suction from the engine recirculating circuit just ahead of the back pressure valve 14 through the conduit 18. The suction conduit 18 communicates flow to the mixing valve 20, which will later be explained, and the flow is then communicated through a short section of conduit 22 to the suction of the pump P2. The discharge from the pump P2 passes through the conduit 24 to the radiator R from whence it flows through one or more aftercoolers A through which the cooling fluid from the radiator passes in parallel. The aftercoolers, of course, are used to cool down the air that is discharged from the conventional supercharger designated S, on its way to the intake manifold (not shown) of the engine E.

Engines of the size with which we are concerned are usually also provided with an oil cooler OC, so that coolant from the aftercoolers passes through conduit 28 and bypass valve 30 which controls the amount of coolant that is passed directly through the cooler and the amount which is bypassed to thereby control the temperature of the oil out of the oil cooler. Bypass valve 30 is a thermostatic valve of the type which is quite conventional and whose operation is controlled by a suitable sensor in the oil outlet line leading to the engine. After suitably cooling the oil for the engine, the cooling fluid passes through the line 32 leading to the other inlet of the mixing valve 20.

The mixing valve 20 is also a thermostatic valve which is controlled by the temperature of the cooling fluid in the conduits 16 leading to the inlet of the engine E. Upon a rise in temperature in the inlet conduit 16, the valve 20 opens communication of the conduit 32 containing coolant from the radiator circuit with the suction side of the pump P2 and decreases the flow from the conduit 18 from the engine jacket recirculating circuit to the pump P2. To complete the circuit and maintain constant volumes in the two circuits, an additional crossover conduit 34 is provided between the conduit 32 and the discharge side of the back pressure valve 14. The conduit 34 also includes a back pressure valve 36 which maintains a predetermined back pressure on the radiator cooling circuit, so that flow only passes back into the engine coolant recirculating circuit as the valve 20 chokes off the flow from the radiator coolant recirculating conduit 32. Flow through the radiator circuit is maintained constant at approximately 281 gallons per minute. As flow from the line 32 is choked off by the mixing valve 20, the back pressure valve 36 opens up to permit an increased amount of the 281 gallons per minute to flow back into the engine jacket coolant recirculating circuit. This larger amount of cooler fluid reduces the temperature of the engine inlet until a temperature of approximately 160° F. is reached, whereupon the mixing valve 20 is repositioned to reduce the amount of flow that is passed between the engine recirculating circuit and the radiator recirculating circuit, so as to maintain the temperature of the engine inlet at approximately 160° F. In the embodiment shown in FIG. 1, the pump P2 is driven by a separate electrical motor, and the pump P2 is designed to deliver a constant flow which, in the present instance, is approximately one-third that of the engine recirculating flow.

In the operation of the engine shown in FIG. 1, the radiator R is designed to cool the fluid passing therethrough to a temperature approaching 20° F. of the ambient temperature. The aftercoolers A are designed to cool the air passing therethrough to a temperature which is 10° F. greater than the temperature of the cooling liquid that is circulated therethrough. The system is such, therefore, that the air leaving the aftercoolers would be approximately 30° F. above ambient temperature at all times. As the outside ambient temperature drops, therefore, the air into the intake manifold of the engine E drops therewith, so that an increased load can be placed upon the engine E, and a resulting increase in power output and economy of fuel consumption is realized.

The system shown in FIG. 2 of the drawings is substantially similar to that shown in FIG. 1, and differs therefrom principally in the type of pump P2 which is utilized to produce circulation in the radiator circulating circuit. Those portions of the system shown in FIG. 2 which correspond to similar portions of FIG. 1 are designated by like reference numerals characterized further in that a prime mark is affixed thereto. FIG. 2 of the drawing indicates that the pump P2′ is driven by a turbine T that is placed in the engine recirculating circuit. The energy which is utilized by the pump P2′ is derived, therefore, from the pump P1′, which in turn is driven directly from the engine E′, so that no external source of power is necessary.

It will be apparent that the objects heretofore enumerated as well as others have been accomplished and that there has been provided a cooling system for an internal combustion engine, which cools the air fed to the engine to as great an extent as is possible with a radiator to thereby improve the efficiency of the engine over the prior art systems.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

What I claim is:

1. A method of cooling an internal combustion engine of the type having a cooling jacket, a radiator, and a supercharger and aftercooler for the air supply to the engine, said method comprising: providing a large recirculating flow of cooling fluid through the jacket of the engine in a first circuit that does not include said radiator, providing a smaller recirculating flow through the radiator and the aftercooler in a second coolant circuit, bleeding a stream of fluid from the first mentioned coolant circuit to the second coolant circuit in response to a rise in engine temperature, and causing an equal amount of fluid to return from the second coolant circuit to the first, and decreasing the interflow between the two circuits upon a drop in engine temperature, whereby the air flow to the engine cooled by said second coolant circuit is kept at as low a temperature as possible under all operating conditions.

2. In a cooling system for an internal combustion engine having a cooling jacket and a supercharger which supplies combustion air to the engine; a radiator, an aftercooler for cooling air from said supercharger prior to entering said engine, a first coolant circuit for circulating cooling liquid through the jacket of said engine, a first pump for producing flow through said first coolant circuit, first back pressure means creating a back pressure on said pump, a second coolant circuit for passing flow sequentially through said radiator and aftercooler, a second pump for producing recirculating flow through said second coolant circuit, said second pump being positioned to receive flow from said aftercooler and discharge it to said radiator, a first connection communicating the back pressure in said first coolant circuit produced by said first pump to the suction side of said second pump, a second connection communicating flow from said aftercooler to the downstream side of said first back pressure means in said first coolant circuit, second back pressure means in said second connection creating a back pressure on said second coolant circuit, and proportioning valve means proportioning the recirculatory flow of said second coolant circuit to the suction of said second pump and the flow from said first coolant circuit to the suction of said second pump through said first connection, said proportioning valve decreasing flow from said first circuit to said second circuit in response to a drop in engine temperature, and increasing recirculated flow from said second circuit to the suction of said second pump in response to an increase in engine temperature.

3. In an internal combustion engine of the type having a cooling jacket, a radiator, and a supercharger and aftercooler for the air supply to the engine, the combination of means providing a large recirculating flow of cooling fluid through the jacket of the engine in a first circuit that does not include said radiator, means providing a smaller recirculating flow through the radiator and the aftercooler in a second coolant circuit, and means to bleed a stream of fluid from the first mentioned coolant circuit to a position in said second circuit upstream of said radiator in response to a rise in engine temperature, and causing an equal amount of fluid from a point on the downstream side of said aftercooler in said second circuit to return to said first circuit, said last mentioned means decreasing the interflow between the two circuits upon a drop in engine temperature, whereby the air flow to the engine cooled by said second coolant circuit is kept at as low a temperature as possible under all operating conditions.

References Cited in the file of this patent

UNITED STATES PATENTS

| | | |
|---|---|---|
| 1,723,879 | Morton | Aug. 6, 1929 |
| 2,129,846 | Knochenhauer | Sept. 13, 1938 |
| 2,231,939 | Nallinger | Feb. 18, 1941 |
| 2,606,539 | Field | Aug. 12, 1952 |